UNITED STATES PATENT OFFICE.

JACOBUS JAN WILLEM HENDRIK VAN DER TOORN, OF THE HAGUE, NETHERLANDS.

PLASTIC COMPOSITION.

1,183,255.      Specification of Letters Patent.      Patented May 16, 1916.

No Drawing.     Application filed September 22, 1915.    Serial No. 52,018.

*To all whom it may concern:*

Be it known that I, JACOBUS JAN WILLEM HENDRIK VAN DER TOORN, a subject of the Queen of the Netherlands, residing at Nassauplein 19, The Hague, Kingdom of the Netherlands, have invented certain new and useful Improvements in Plastic Composition, of which the following is a specification.

The object of my invention is a method for producing a composition for the purpose of manufacturing building elements, serving for the construction or erection of walls, face-work, walls of dressed or worked stone, front or retaining walls, masonry work of any kind, columns or stanchions, casings, caissons, and buildings of any kind, the characteristic feature of which consists in the composition of cement, with granular titaniferous iron (titaniferous iron oxid) and water; and the object of my invention consists further in making the said objects from the said composition.

In the manufacture of artificial stones as coping stones, or concrete curbstones, or of artificial stones of any kind, as pavings, or artificial block pavements (cobble stones), as they are hitherto manufactured, a composition is used, which consists of cement, sand and water. Constructions made of this known material do not however answer as to the practical requirements, especially not as to the compressional strength of the composition so produced, and of the constructions made from and with the same, and also not as to the quickness required in the setting of the cement.

It has been found that beton blocks of very large size, such as used at harbor constructional works, as for breakwaters, or for rafting the bottoms of docks, are crushed by and removed from their seat by heavy seas for the reason, that due to their small specific gravity, they do not offer sufficient compressional strength against destructive powers.

It is found in practice that articles formed of my plastic composition are more suitable for substitution of natural stone, when the composition includes an element which lends to the increasing of the specific gravity of the article, since the same will offer greater resistance against wear as bodies of inferior specific strength; further that with sea- and riverwork in general, and with the building of fortifications, an artificial material having great hardness, great specific gravity and great compressional strength, and having further the capacity of quick setting, will be of great utility, and will offer great advantages beyond the concretes (betons) used hitherto.

Now, the object of my present invention is a double one and consists: (1) in the method of providing for and in the manufacture as a new industrial product of a composition, having the said properties of great specific gravity, of great compressional strength, and of quick setting capacity; and (2) to provide means for further improving of the said properties of the composition, made according to my present invention, especially for improving the setting capacity of the same.

Ad 1. In order to obtain as a new industrial article the composition suitable for making artificial stone or of constructions and builders' work of the character above described, as coping stones, concrete curbstones, pavings, artificial block pavements, concrete constructions, further for executing water works, fortifications and the like,—I use a composition of cement, with granular titaniferous iron (titaniferous iron oxid) (this latter in its natural state or previously cleaned), and their mixture with water, whereby the quantity of the said bodies used in the mixture, may be varied according to the purposes for which the same is to be used. The percentage of the said bodies in the composition may be varied just as this has been done hitherto by making a composition composed of cement, sand and water.

Due to the great specific gravity of the titaniferous iron to the composition produced by mixing titaniferous iron with cement,—a great specific weight is imparted to the constructions or builder-work, or the constructional elements made or manufactured with the said composition. The specific gravity of such manufactures is considerably higher than that of the ordinary beton constructions, or of bodies of any kind, made from ordinary concrete.

Due to the great adhesion of the cement and titaniferous iron with regard to each other,—and due further to the fact, that the coefficient of expansion of the cement and of the titaniferous iron is uniform or nearly uniform one with respect to the other, all constructions or elements of construction made of same, will be of great resistance, strength and durability.

The titaniferous iron which as it is known, consists mainly of titaniferous iron oxid (titanic acid), in its natural state, is not influenced by rust, and therefore articles or objects of any kind made with a composition as above described and containing titaniferous iron, are most suitable for executing such building or constructional work as is subjected to great wear; the resistance of this material being very great against wearing. This material shows further the great advantage of having a quick hardening capacity.

Ad 2. Upon further trials, I found that the said qualities of the composition thus described, and of the buildings or constructions, erected or made with the same, and of the constructional elements manufactured with the said composition and the setting capacity of the said composition, may still further be improved if the titaniferous iron, such as found in the nature, is transformed into a finely divided or finely ground state; and if to the finely ground titaniferous iron, oxids of calcium, magnesium, aluminium, silicon, or of other suitable binding mediums are added, also in finely pulverized state, a most finely divided substance, a most finely grained mortar will be attained. Such material is very suitable for making artificial stones and other constructional elements of high quality as columns, slabs, artificial marble, artificial agate, and the like.

The proportion into which the titaniferous iron oxid is mixed with the said bodies, as with the oxids of calcium, magnesium, aluminium, silicon, and the like, may be varied according to the desired setting capacity of the material to be attained, viz., if the production of a quick or slow setting composition is being intended.

The composition so obtained is also highly fireproof.

The technical qualities of the said material as described, are attained by the fact that due, to the fine grinding of the titaniferous iron, the number of the individual elements within the unit of mixture is enlarged, and the titaniferous iron particles are more uniformly divided in the same.

By adding water to this composition, the same is caused to set; and objects of the described qualities may be formed or manufactured from the same.

In order to impart to the composition any desired color, or in order to produce objects with certain desired designs, as the designs of artificial marble, of agate and the like, suitable coloring substances are added in proper quantities to the mass in its dry state, or after water has been added to the same; whereafter the mass with the added coloring substances is thoroughly stirred, and then allowed to set.

In order to improve the quick setting capacity of the matrix, suitable substances may be added, as carbonate of soda.

I claim:

1. A plastic composition comprising pulverized titaniferous iron oxid, Portland cement, water and a binding medium of pulverized oxids of calcium, magnesium, aluminium and silicon.

2. A plastic composition consisting of pulverized titaniferous iron oxid, Portland cement, water and a binding medium of pulverized oxids of calcium, magnesium, aluminium and silicon, a coloring material and carbonate of soda.

In testimony whereof I have affixed my signature in presence of two witnesses.

JACOBUS JAN WILLEM
    HENDRIK van der TOORN.

Witnesses:
 IRENE F. RIX,
 N. Y. SEYFFER.